(12) United States Patent
Lefler et al.

(10) Patent No.: US 10,322,745 B2
(45) Date of Patent: Jun. 18, 2019

(54) TORQUE STEERING MITIGATION FOR ELECTRIC POWER STEERING

(71) Applicant: Steering Solutions IP Holding Corporation, Saginaw, MI (US)

(72) Inventors: Price T. Lefler, Saginaw, MI (US); Shrenik P. Shah, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 15/019,591

(22) Filed: Feb. 9, 2016

(65) Prior Publication Data

US 2016/0236708 A1  Aug. 18, 2016

Related U.S. Application Data

(60) Provisional application No. 62/115,967, filed on Feb. 13, 2015.

(51) Int. Cl.
*B62D 5/04* (2006.01)

(52) U.S. Cl.
CPC ......... *B62D 5/0463* (2013.01); *B62D 5/0472* (2013.01); *B62D 5/046* (2013.01)

(58) Field of Classification Search
None
See application file for complete search history.

(56) References Cited

U.S. PATENT DOCUMENTS

| 2006/0041355 A1 | 2/2006 | Blundell et al. |
| 2006/0060412 A1* | 3/2006 | Bolourchi ............ B62D 5/008 180/443 |

FOREIGN PATENT DOCUMENTS

| CN | 1628050 A | 6/2005 |
| CN | 101734282 A | 6/2010 |
| CN | 101858806 A | 10/2010 |
| CN | 102666256 A | 9/2012 |
| EP | 0842841 A1 | 5/1998 |
| JP | 2007153158 A | 6/2007 |
| JP | 2007245768 A | 9/2007 |
| JP | 5293738 B2 | 9/2013 |

OTHER PUBLICATIONS

Extended European search report for related European application No. 16155347.4, dated Jul. 14, 2016 (8 pages).
Chinese Office Action for application No. 201610305032.1 dated Sep. 22, 2017, 5 pages.

* cited by examiner

*Primary Examiner* — Abby Y Lin
*Assistant Examiner* — Kyung J Kim
(74) *Attorney, Agent, or Firm* — Cantor Colburn LLP

(57) ABSTRACT

A system for mitigation of a torque steer includes a base gain generation module that generates a base gain based on a transmission torque, a learning module that generates a learned gain based on the transmission torque and the estimated pinion torque, and a command generation module that generates a motor torque command from the learned gain, the transmission torque, and the base gain.

20 Claims, 5 Drawing Sheets

TORQUE STEERING MITIGATION FOR ELECTRIC POWER STEERING

CROSS-REFERENCES TO RELATED APPLICATIONS

This patent application claims priority to U.S. Provisional Patent Application Ser. No. 62/115,967, filed Feb. 13, 2015, which is incorporated herein by reference in its entirety.

BACKGROUND OF THE INVENTION

The invention relates to torque steering mitigation for electric power steering (EPS).

In front wheel drive vehicles, imbalances in driveline geometry (e.g. unequal half shaft lengths, different half shaft input angles), can cause an imbalance in driving force applied by the wheels relative to one another. This imbalance in driving force can cause the vehicle to steer. Typically, the imbalance is small and does not cause a change in vehicle direction. However, when large amounts of torque are applied to a road surface, driving force imbalances can be exaggerated, causing a change in direction. For example, the vehicle could pull in one direction during a hard acceleration. This behavior is known as a torque steer.

Torque steer can be separated into two categories including transient and quasi-steady state. Transient torque steer is relatively short in duration and can be difficult to consistently reproduce. Quasi-steady state torque steer is consistent, pulling the same direction and with a force that is related to the driving force of the vehicle.

SUMMARY OF THE INVENTION

In accordance with one aspect of the invention, a system for mitigation of a torque steer includes a base gain generation module that generates a base gain based on a transmission torque, a learning module that generates a learned gain based on the transmission torque and the estimated pinion torque, and a command generation module that generates a motor torque command from the learned gain, the transmission torque, and the base gain.

In accordance with one aspect of the invention, a vehicle including a system for mitigation of a torque steer includes a base gain generation module that generates a base gain based on a transmission torque, a learning module that generates a learned gain based on the transmission torque and an estimated pinion torque, and a command generation module that generates a motor torque command from the learned gain, the transmission torque, and the base gain.

In accordance with one aspect of the invention, a method for mitigation of a torque steer comprises generating a base gain based on a transmission torque; generating a learned gain based on the transmission torque and an estimated pinion torque; generating a motor torque command from the learned gain, the transmission torque, and the base gain.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
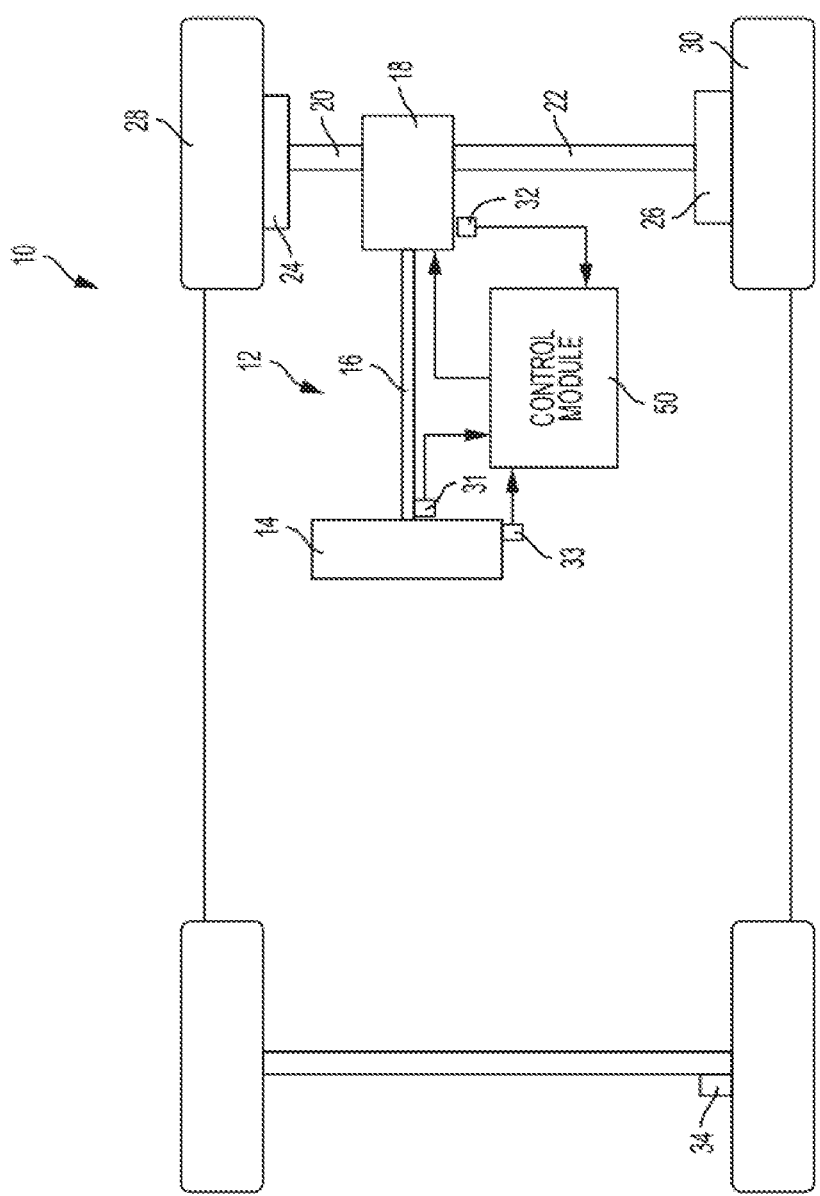
FIG. 1 depicts a vehicle including a steering system in accordance with one aspect of the invention.

Referring now to the Figures, where the invention will be described with reference to specific embodiments, without limiting same, an embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. It should be noted that the steering system 12 may be a rack assist EPS (REPS) as well. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the left tie rod 20 and the right tie rod 22 which in turn moves left and right steering knuckles 24, 26, respectively. The left knuckle 24 is coupled to a left roadway wheel 28, and the right knuckle 26 is coupled to a right roadway wheel 30 of the vehicle 10.

As shown in FIG. 1, the vehicle 10 further includes various sensors 31-34 that detect and measure signals of the steering system 12 and/or of the vehicle 10. The sensors generate sensor signals based on the measured signals. In one embodiment, a torque sensor 31 is provided for sensing a torque placed on the handwheel 14. In the exemplary embodiment as shown, the torque sensor 31 is placed on the handwheel 14, however it is to be understood that the torque sensor 31 may not always be placed near or on the handwheel 14. In one embodiment, the motor position/velocity sensor 32 senses motor position and/or velocity, and the handwheel position/velocity sensor 33 senses handwheel position and/or velocity. In addition, the vehicle 10 may include a wheel speed sensor 34 to assist in measuring vehicle speed. In the embodiment shown in FIG. 1, a single wheel speed sensor 34 is attached near a rear wheel of the vehicle 10. Although a single wheel speed sensor 34 is shown in FIG. 1, a plurality of wheel speed sensors may also be included. The wheel speed sensor 34 may be located on a transmission case and be driven by an output gear of a transmission of the vehicle 10.

A control module 50 controls the operation of the steering system 12 based on one or more of the sensor signals and further based on the steering control systems and methods of the embodiments described herein.

In various embodiments, the control module 50 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the module shown in FIG. 2 may be further partitioned.

Figure 2:
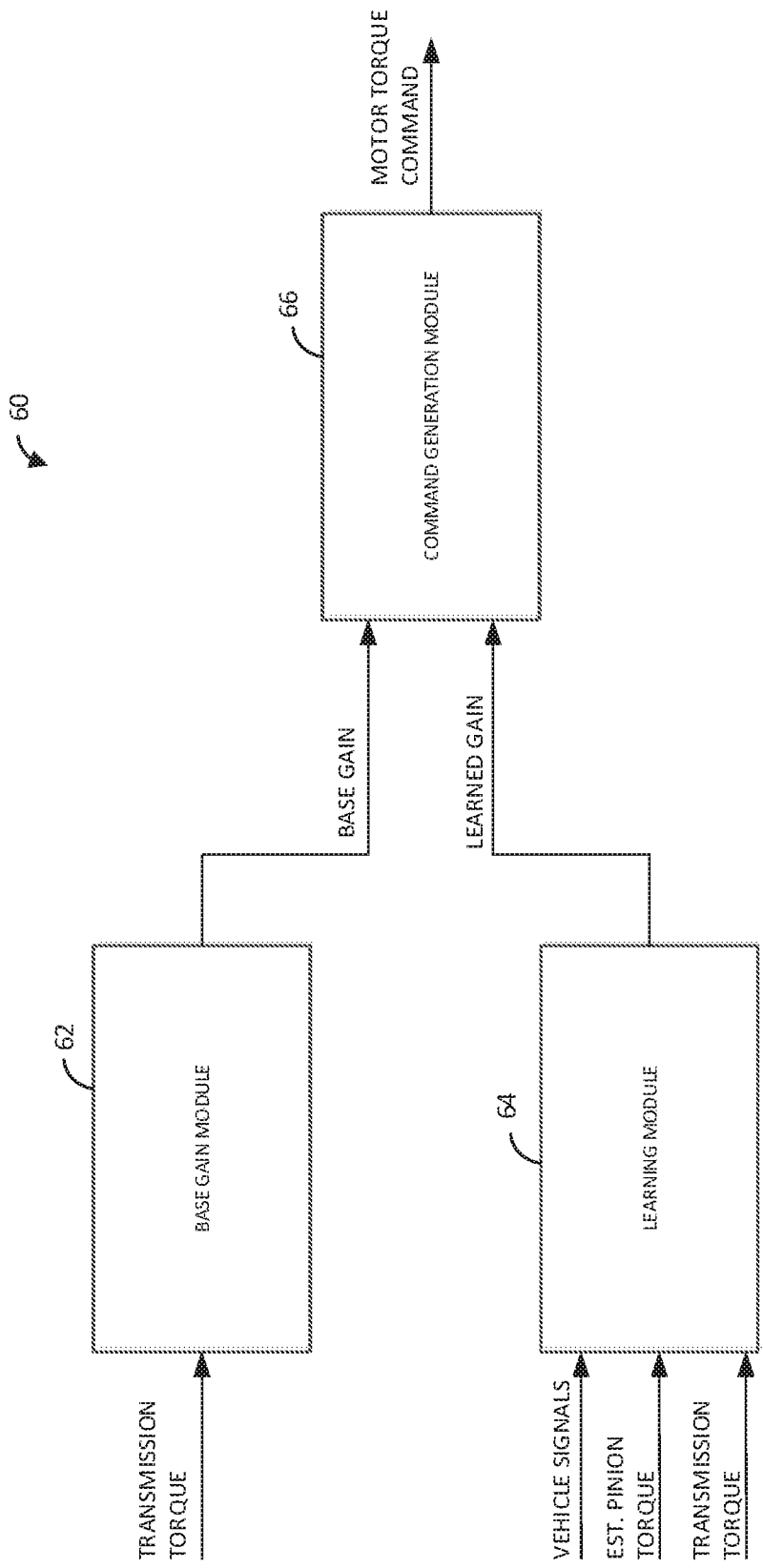
FIG. 2 shows an embodiment of a torque steer mitigation module of the control module in accordance with one aspect of the invention.

FIG. 2 illustrates an embodiment of a torque steer mitigation module 60 of the control module 50 of FIG. 1. In one embodiment, the torque steer mitigation module 60 includes a base gain module 62, a learning module 64, and a command generation module 66. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the module shown in FIG. 2 and the subsequent figures may be further partitioned.

As described in more detail below, the base gain module may generate a base gain from a transmission torque signal. Additionally, the learning module 64 of the control module 50 may calculate a learned gain from an estimated pinion torque and the transmission torque. The learned gain and the base gain may be processed by the command generation module 66, to generate a motor torque command.

A quasi-steady state torque steer can be mitigated by providing a force that acts opposite to forces caused by a torque steer event. The torque steer mitigation module 60 can determine a relationship between a torque steer force to a driving force. The driving force may be a force applied by a driver to keep the vehicle traveling in a straight path. Driving force may include the t-bar torque, a motor torque command and transmission torque. A t-bar torque and motor torque command can be used as an estimate of torque at pinion, and therefore an additional torque sensor is not required. A linear relationship may exist between the estimate of torque at pinion and the transmission torque. As described in more detail below, the torque steer mitigation module 60 may monitor the transmission torque and apply correction at transmission torque levels that exceed a threshold.

Figure 3:
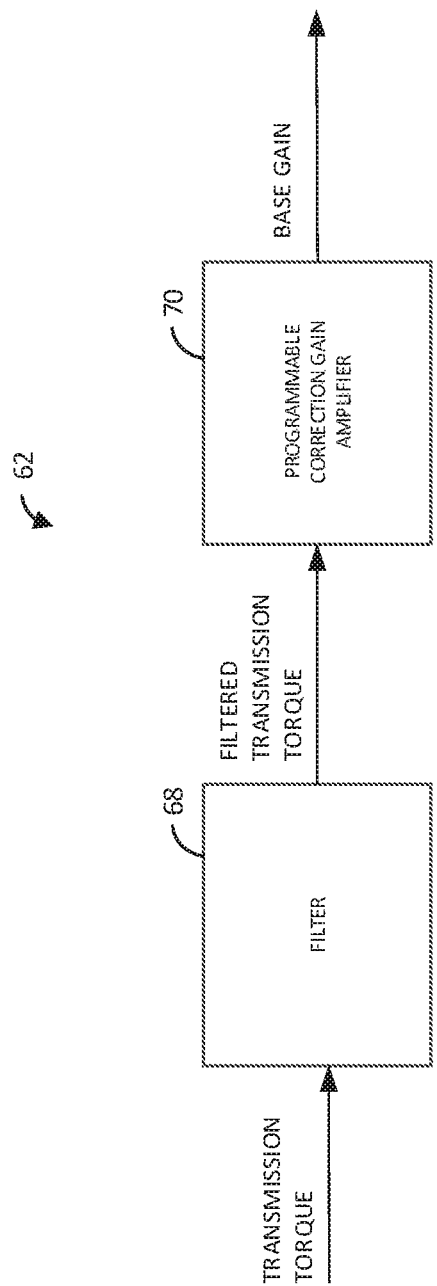
FIG. 3 shows a base gain module of the torque steer mitigation module in accordance with one aspect of the invention.

Turning to FIG. 3, the base gain module 62 is described in more detail. In some embodiments, the base gain module 62 may include a filter 68 and a programmable correction gain amplifier 70. In some embodiments, the base gain module 62 receives a transmission torque signal, and the filter 68 is applied to the transmission torque signal. The filter 68 may be a deadband filter that selectively cancels transmission torque values falling between a first threshold value and a second threshold value. The filter 68 may apply a graduated constant value (e.g. non-zero value) for transmission torque values falling outside of the threshold values. Additionally, although a transmission torque signal is received by the base gain module 62 as shown in FIG. 3, alternatively an engine torque signal may be analyzed by the filter 68.

In the embodiment shown in FIG. 3, a filtered transmission torque is output by the filter 68. The filtered transmission torque is sent to the programmable correction gain amplifier 70 that multiplies the filtered transmission torque by a gain value that depends on the magnitude of the filtered transmission torque. The programmable correction gain amplifier 70 may further comprise a memory (not shown) that is updated based on learned gain values produced by the learning module 64. The programmable correction gain amplifier 70 generates a base gain signal that is output to the command generation module 66 (FIG. 2).

Figure 4:
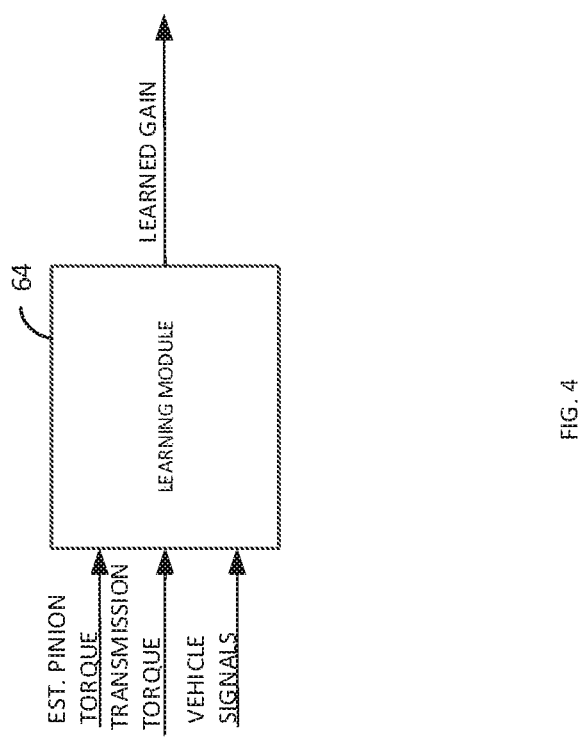
FIG. 4 shows a learning module of the torque steer mitigation module in accordance with one aspect of the invention.

Turning to FIG. 4, the learning module 64 is described in more detail. The learning module 64 of the control module 50 (FIG. 1) may calculate a learned gain from an estimated pinion torque and the transmission torque. Variation between vehicles and changes to an existing vehicle that could change torque steer characteristics of the vehicle.

Further, the learning module may enable a learning algorithm that calculates the learned gain. The learning algorithm is, in some embodiments, enabled by comparing handwheel torque to at least one threshold value. An increase in handwheel torque during vehicle acceleration may indicate that an adjustment provided by the learning module is required.

If handwheel torque is greater in magnitude than a given threshold, learning may be enabled because the driver may be actively steering the vehicle to correct for the torque steer. An estimated pinion torque may be divided by a transmission torque to determine a learned gain. The learned gain may be stored within a memory (not shown) of the of the learning module 64. A vehicle signal provided by a vehicle event could enable the transmitting of the learned gain to the correction gain amplifier 71 of the base gain module 62 (FIG. 3). A vehicle event can be, but is not limited to, an ignition key cycle, a shift in transmission of the vehicle to a park mode, a power cycle of the vehicle, or any other type of update request provided to or within the vehicle. In some embodiments, the transmission torque is multiplied by the learned gain.

Figure 5:
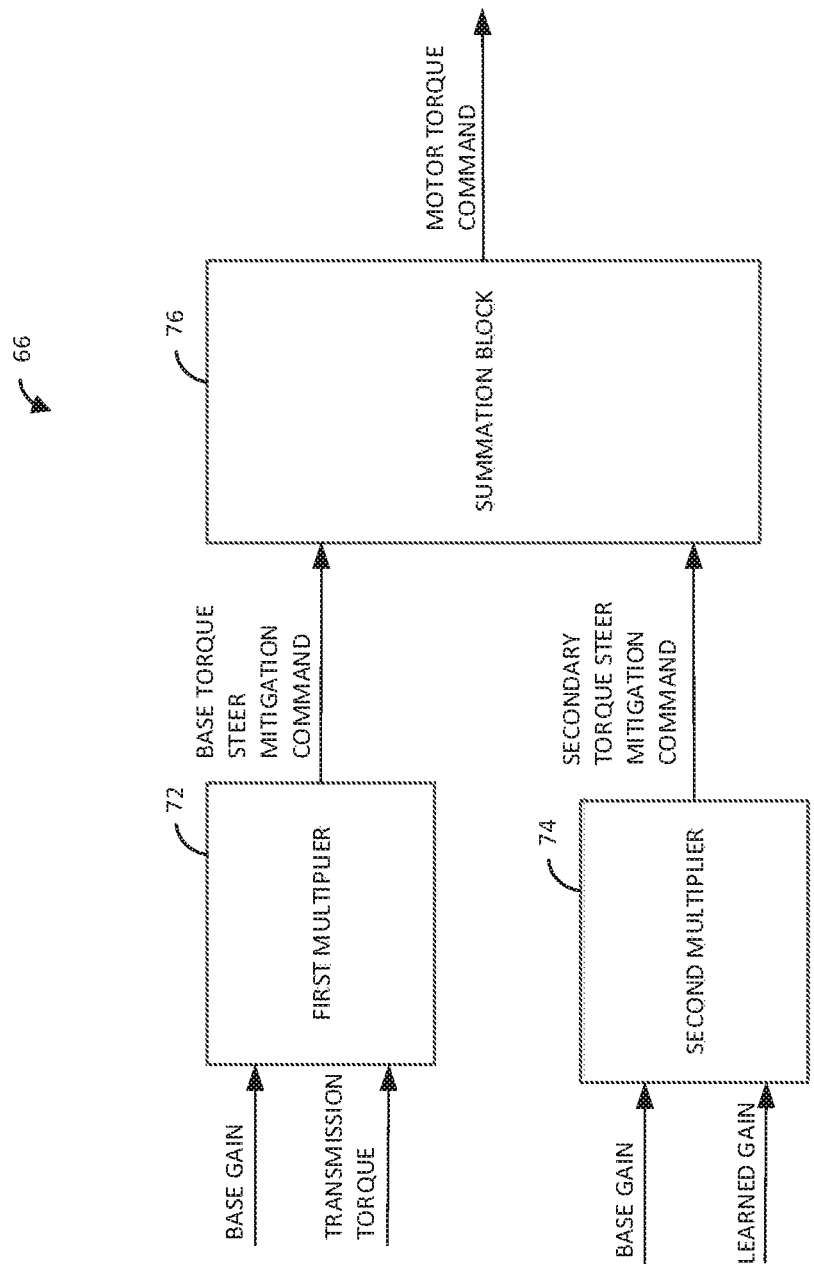
FIG. 5 shows a command generation module in accordance with one aspect of the invention.

FIG. 5 depicts the command generation module 66 in more detail. The command generation module 66 may generate a motor torque command. In some embodiments, the command generation module 66 multiplies the base gain with the transmission torque at a first multiplier 72 to produce a base torque steer mitigation command. Additionally, or alternatively, the command generation module 66 generates a secondary torque steer mitigation command based on a product of the transmission torque and the learned gain at second multiplier 74. The base torque steer mitigation command and the secondary torque mitigation command may be summed by the command generation module 66 at summation block 76, to generate the motor torque command. The motor torque command may be used to control a motor (FIG. 1) of the power steering system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric power steering system comprising:
   a steering assist unit including a motor;
   a base gain generation module configured to receive and transform a transmission torque signal into a base gain;
   a learning module configured to receive the transmission torque signal and an estimated pinion torque, and together transform the transmission torque signal and the estimated pinion torque into a learned gain; and a command generation module configured to receive and together transform the base gain and the learned gain from the respective base gain generation module and the learning module that generates a motor torque command from the learned gain, the transmission torque, and the base gain, wherein the motor torque command is used to control the motor and thereby mitigate a torque steer.

2. The system of claim 1, the estimated pinion torque is calculated from a t-bar torque and a motor torque command.

3. The system of claim 1, the learning module compares a handwheel torque to a threshold value to determine whether the learned gain is applied to the base gain.

4. The system of claim 3, the learned gain is stored within a memory of the learning module, the learned gain is transmitted to a correction gain amplifier of the base gain generation module.

5. The system of claim 4, a vehicle event enables an updating of the learned gain in the memory of the learning module.

6. The system of claim 1, the command generation module generates the motor torque command based at least in part on a first product of the base gain and the transmission torque.

7. The system of claim 6, the command generation module further generates the motor torque command based at least in part on a second product of the base gain and the learn gain.

8. The system of claim 1, the motor torque command is a summation of a base torque steer mitigation command and a secondary torque steer mitigation command.

9. A vehicle including an electric power steering system, the vehicle comprising:
a handwheel;
a steering shaft engaged to the handwheel;
a steering actuator motor coupled to the steering shaft;
at least one processor;
a base gain generation module including the at least one processor and configured to receive and process a transmission torque signal and thereby generate a base gain;
a learning module including the at least one processor and configured to receive and together process the transmission torque signal and an estimated pinion torque and thereby generate a learned gain; and
a command generation module including the at least one processor and configured to receive and together process the learned gain, the transmission torque, and the base gain, and thereby generate and output a motor torque command to effect control of the steering actuator motor and for mitigation of a torque steer.

10. The vehicle of claim 9, the estimated pinion torque is calculated from a t-bar torque and a motor torque command.

11. The vehicle of claim 9, the learning module compares a handwheel torque to a threshold value to determine whether the learned gain is applied to the base gain.

12. The vehicle of claim 11, the learned gain is stored within a memory of the learning module, the learned gain is transmitted to a correction gain amplifier of the base gain generation module.

13. The vehicle of claim 12, a vehicle event enables an updating of the learned gain in the memory of the learning module.

14. The vehicle of claim 13, the command generation module further generates the motor torque command based at least in part on a second product of the base gain and the learn gain.

15. The vehicle of claim 9, the command generation module generates the motor torque command based at least in part on a first product of the base gain and the transmission torque.

16. The vehicle of claim 9, the motor torque command is a summation of a base torque steer mitigation command and a secondary torque steer mitigation command.

17. A method of operating an electric power steering system comprising:
receiving a transmission torque signal by a base gain generation module;
processing the transmission torque signal and thereby generating a base gain by the base gain generation module;
receiving the transmission torque signal and an estimated pinion torque by a learning module;
together processing the transmission torque signal and the estimated pinion torque and thereby generating a learned gain by the learning module;
receiving the base gain, the learned gain, and the transmission torque signal by a command generation module;
together processing the base gain, the learned gain, and the transmission torque signal and thereby generating a motor torque command by the command generation module; and
receiving the motor torque command by a steering assist unit for mitigating a torque steer.

18. The method of claim 17, the estimated pinion torque is calculated from a t-bar torque and a motor torque command.

19. The method of claim 17, further comprising comparing a handwheel torque to a threshold value to determine whether the learned gain is applied to the base gain.

20. The method of claim 19, the learned gain is stored within a memory, the learned gain is transmitted to a correction gain amplifier.

* * * * *